(No Model.)
J. P. CREIGHTON.
FRICTION GEARING OR PULLEY.
No. 286,533. Patented Oct. 9, 1883.
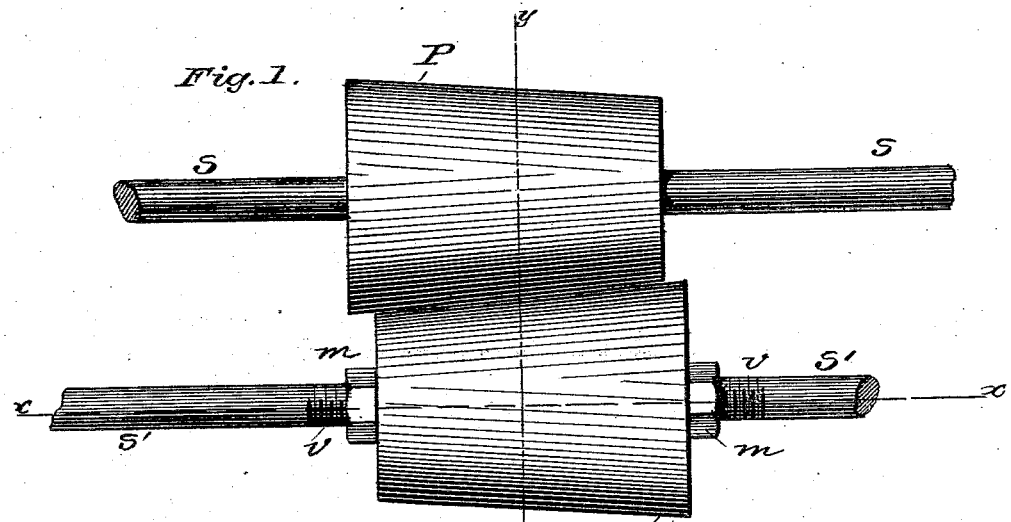
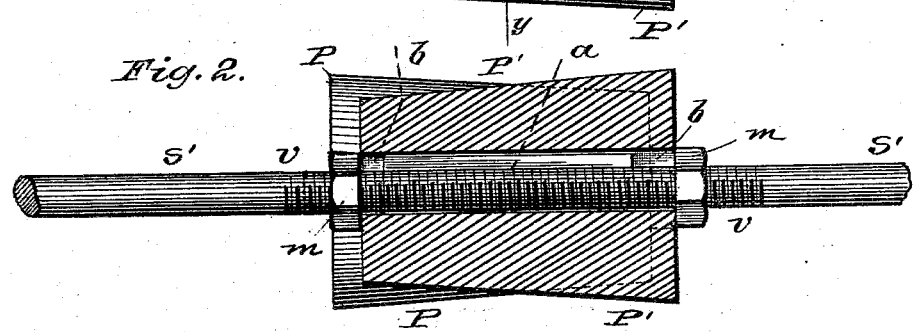
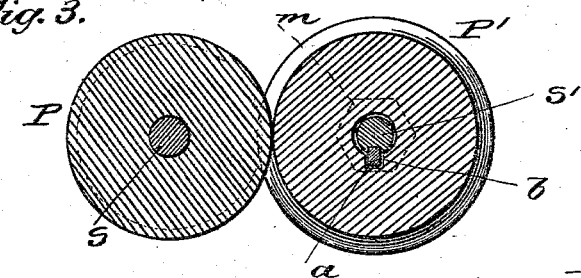
Witnesses:
Philip Masi.
E. H. Bates
Inventor:
James P. Creighton,
by Anderson Smith
his Attorneys.

UNITED STATES PATENT OFFICE.

JAMES P. CREIGHTON, OF LOUISVILLE, KENTUCKY, ASSIGNOR OF ONE-HALF TO WILLIAM DEERING, OF SAME PLACE.

FRICTION GEARING OR PULLEY.

SPECIFICATION forming part of Letters Patent No. 286,532, dated October 9, 1883.

Application filed March 17, 1883. (No model.)

*To all whom it may concern:*

Be it known that I, JAMES P. CREIGHTON, a citizen of the United States, residing at Louisville, in the county of Jefferson and State of Kentucky, have invented certain new and useful Improvements in Friction Gearing or Pulleys; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a plan view. Fig. 2 is a vertical section through one of the pulleys, and Fig. 3 is a cross-sectional view of the same.

This invention has relation to friction pulleys or gearing; and it consists in providing, in connection with parallel shafts, conical friction-pulleys having their larger ends turned in opposite directions, and adjusting devices whereby one or both of said friction-pulleys may be moved longitudinally to effect renewed impact, all as hereinafter set forth.

In the accompanying drawings, the letters S and S' indicate parallel shafts, and P and P' are conical pulleys, arranged, respectively, on said shafts and in frictional contact with each other.

Heretofore it has been customary, when friction-pulleys have become worn away or their shafts unduly pressed asunder, to adjust for proper contact by providing new pulleys, or by moving the shafts and their journal-boxes.

The object of this invention is to provide for renewed impact of the pulleys by shifting either or both of them slightly in the longitudinal direction. The shaft, therefore, of one of said pulleys is usually provided with a rib or spline, as at $a$, and the corresponding pulley with an internal groove, $b$, in its bearing, which engages the spline of the shaft and enables the pulley to be moved in the direction of the length of the shaft, while holding it securely with reference to the rotary movement. At each end of the pulley a nut, $m$, is located, engaging a thread, $v$, on the shaft. When the pulley needs adjustment to rectify its frictional contact, one of these nuts is loosened, and the other is forcibly turned up against the end of the pulley, and moves the latter until proper contact is attained. Then the first nut is turned back against the pulley, so that it is firmly held in the new position; or the pulley may be adjusted by hand and held in position after adjustment by means of ring-clamps or other common fastenings.

What I claim, and desire to secure by Letters Patent, is—

Longitudinally-adjustable conical friction-pulleys on parallel shafts, having their larger ends turned in opposite directions, and adjustable fastening devices, whereby one or both of said friction-pulleys may be adjusted longitudinally and secured in position after adjustment, substantially as specified.

In testimony whereof I affix my signature in presence of two witnesses.

JAMES P. CREIGHTON.

Witnesses:
P. D. LOGAN,
ARTHUR P. MILLS.